United States Patent [19]

Buhrman

[11] Patent Number: 4,653,536
[45] Date of Patent: Mar. 31, 1987

[54] FLUID FLOW REVERSER ASSEMBLY

[75] Inventor: Rudolph Buhrman, Johannesburg, South Africa

[73] Assignee: Alloyfab (Proprietary) Limited, South Africa

[21] Appl. No.: 796,642

[22] Filed: Nov. 8, 1985

[30] Foreign Application Priority Data

Nov. 9, 1984 [ZA] South Africa .................. 84/8765

[51] Int. Cl.⁴ ........................................... F16K 11/074
[52] U.S. Cl. ............................... 137/625.43; 137/874
[58] Field of Search ................ 137/625.21, 625.43, 137/874, 625.46

[56] References Cited

U.S. PATENT DOCUMENTS

| 721,743 | 3/1903 | Richmond | 137/874 X |
| 1,055,781 | 3/1913 | Mitchell | 137/625.21 |
| 2,855,000 | 10/1958 | Van Allen | 137/625.43 |
| 3,037,526 | 6/1962 | Wheeler | 137/625.21 X |
| 3,194,267 | 7/1965 | Lyon | 137/625.43 X |

FOREIGN PATENT DOCUMENTS 2303296 8/1973 Fed. Rep. of Germany ...... 137/874
2437754 2/1976 Fed. Rep. of Germany ...... 137/625.21
824736 2/1938 France .................. 137/625.43

Primary Examiner—Robert G. Nilson
Attorney, Agent, or Firm—Brumbaugh, Graves, Donohue & Raymond

[57] ABSTRACT

A fluid flow reverser assembly including a body defining a chamber, a first passageway communicating with a first aperture into the chamber, second and third passageways respectively communicating with second and third apertures into the chamber located in a sealing plate with their surfaces equidistant from the first aperture but angularly spaced apart, a tubular connector member in the chamber having one end co-axially associated with the first aperture and movable so that its other end can be selectively aligned in two operative positions either with the second or third aperture, resilient sealing means mounted on the other end of the connector member for sealing around the second or third apertures, means for moving the connector member between its two operative positions, and a fourth passageway in communication with the chamber so as to be in communication with whichever of the second or third apertures is not in co-operation with said tubular connector member.

8 Claims, 11 Drawing Figures

FLUID FLOW REVERSER ASSEMBLY

BACKGROUND OF THE INVENTION

This invention relates to a fluid flow reverser assembly in which an inlet and an outlet for a fluid to and from the reverser assembly can be selectively coupled to either of two other inlets/outlets to and from the reverser assembly such that the latter, if connected to a shell and tube heat exchanger or the like, can receive the fluid flowing in either of the two possible directions simply by reversing the condition of the flow reverser, whilst the inlet to the assembly and the outlet therefrom do not change their condition.

Such an arrangement is particularly important in cases where heat exchangers are connected to the flow reverser and the purpose of reversing flow periodically is to move, under fluid pressure, cleaning brushes through the heat exchanger tubes in order to dislodge dirt which may become adhered to the inner surface of the heat exchanger tubes. Such flow reversers can be operated automatically at preselected time intervals and, generally speaking the flow is reversed for a relatively short period of time, but at least sufficient to enable the brushes to traverse the length of the heat exchanger tube, and thereafter to again reverse it so that the brushes return to their first positions.

As far as applicant is aware there are three different types of flow reverser assemblies available at the present time. The first is termed a four-way valve (often referred to as a "H"-type valve) in which a rotatable plug in a body therefor is rotatable simply to divert the incoming fluid to either of two possible passages out of which it can flow initially. These four-way valves employ a clearance seal, that is to say there is no positive seal, and accordingly have leakage associated therewith. Also they have a high pressure drop across the valve due to the fact that each of the inlets/outlets, communicates with a chamber within the valve body and, accordingly, no smooth flow path is provided in either of the directions of flow.

The second type of valve which is available is what is termed a switch pipe valve in which an extremely long vane and pipe combination seals longitudinally between two chambers through which fluid flows in each of the two possible directions. In order to reverse the flow, the pipe is moved angularly so that the vane no longer seals but the ends of the pipe are in clearance sealing co-operation with diagonally located inlet/outlet passages. Again a high pressure drop is associated with such a flow reverser assembly or valve in view of the fact that both the incoming and outgoing fluids pass through enlarged chambes having shapes not conducive to smooth fluid flow. Once again clearance type seals are employed which leads to leakage.

A third type of valve or flow reverser assembly which is available is that which may be termed a multi-port cylinder valve. Once again a clearance seal is used (although with not as great a disadvantage as the aforegoing two types of flow reverser assemblies) but the multi-port cylinder has a substantial pressure drop associated therewith in view of the rather tortuous paths through which the fluid must flow. Also, such a valve is difficult to manufacture in view of the relatively close tolerances and large size of clearance fit sealing surfaces which are present.

SUMMARY OF THE INVENTION

It is the object of this invention to provide an improved fluid flow reverser assembly having decreased pressure drops associated therewith and also in which a more positive type of sealing arrangement can be employed.

In accordance with the invention there is provided a fluid flow reverser assembly comprising a body defining a chamber, a first passageway communicating with a first aperture into the chamber, second and third passageways respectively communicating with second and third apertures into the chamber located with their surfaces equidistant from the first aperture but angularly spaced apart, a tubular connector member in the chamber having one end co-axially associated with the first aperture and movable so that its other end can be selectively aligned in two operative positions either with the second or third aperture, resilient sealing means mounted on the other end of the connector member for sealing around the second or third apertures means for moving connector member between its two operative positions, and a fourth passageway in communication with the chamber so as to be in communication with whichever of the second or third apertures is not in co-operation with said tubular connection member.

The fluid flow reverser assembly may comprise a body defining a chamber, a first passageway communicating with a first aperture in a sealing plate and directed away from the latter on the side opposite the sealing surface thereof; second and third passageways positioned on the same side of the sealing plate as the first passageway and communicating with second and third apertures through the sealing plate and located with their axes substantially equidistant from the axis of the first aperture but angularly spaced apart; a tubular connector member having one end co-axially associated with the first aperture in the sealing plate, on the sealing surface side thereof and being rotatable about said axis between two operative positions, one in which its opposite end is aligned with the second aperture and in the other of which it is aligned with the third aperture in the sealing plate; sealing means being provided for sealing the ends of the connector member to the sealing plate; means for rotating the tubular connector member between said two positions; and a fourth passageway associated with the body so as to be in communication with the second or third aperture in the sealing plate whichever is not in co-operation with said tubular connector member.

Further features of the invention provide for the tubular connector member to follow a substantially U-shaped path for the tubular connector member to be fixed relative to an axle which is co-axial with the inlet passage and tubular connector member at the plane of the sealing plate, for said axle to extend outwardly from at least one end of the assembly so as to be rotatable in order to effect movement of the tubular connector member between its operative positions in which is communicates respectively with the second or third apertures in the alternative, for the ends of the tubular connector member to be sealed to the sealing surface of the sealing plate by sealing rings which in turn are sealed to the outer surface of the tubular connector member by O-rings or the like; for the sealing rings to be urged towards the sealing surface by spring means, conveniently a sinuous leaf spring or coil-spring co-operating between the surface of the sealing ring remote from the sealing surface and a flange fixed to the outside of the connector member; and for the housing to be partly defined by a domed member shaped to accommodate said connector member and having a flanged periphery for attachment to a closure member for completing the chamber structure.

The closure member may be the sealing plate itself in which case the sealing plate must be of extremely robust construction. Preferably, a further or second domed member is secured to the first domed member with the sealing plate located therebetween in which case the sealing plate is incomplete to provide communication between the interior of the two domed members. In the latter case the pipes defining the first, second and third passages pass through the second domed member and are sealed thereto whilst terminating at said first, second and third apertures in the sealing plate. The fourth passage defining pipe can, in such a case, simply terminate at the wall which forms the second domed member.

In order that the above defined features may be more fully understood different embodiments of the invention will now be described with reference to the accompanying drawings.

DETAILED DESCRIPTION OF THE PREFERRED EMBODIMENT

Figure 1:
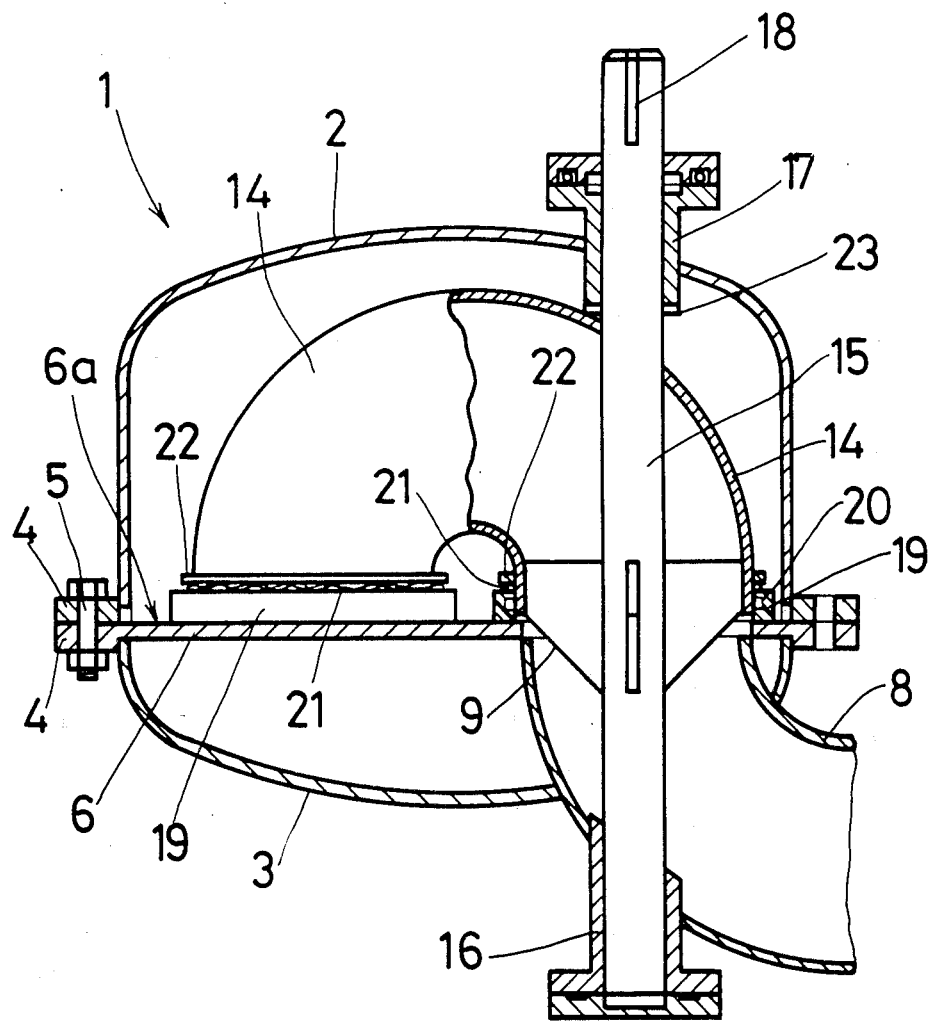
FIG. 1 is a partly sectioned elevation of a first type of flow reverser assembly according to the invention.

Referring firstly to FIGS. 1 to 4 of the drawings, a flow reverser assembly comprises a body 1 defining a chamber and composed of a first dome-shaped member 2 and a second dome-shaped member 3 connected together by flanges 4 and bolts 5. Secured at its periphery to the second dome-shaped member, and substantially co-planar with the flanges 4 thereof is a sealing plate 6 having its sealing surface 6a directed away from the dome-shaped member. Such surface is machined and prepared as may be required. The sealing plate does not occupy the entire opening of the second dome-shaped member and large spaces 7 are provided for communication between the two dome-shaped members.

A first passage defining pipe 8, which will usually form a unidirectional outlet in use, assumes the basic form of an elbow and passes through the wall of the second dome-shaped member to terminate with its axis at right angles to the sealing plates. The end of the first passage defining pipe is secured to the sealing plate to align with a first aperture 9 therein. Similarly second and third passage defining pipes 10 and 11 also pass through the wall of the second dome-shaped member and terminate at apertures 12 and 13 therein, the pipes being welded to the sealing plate around the respective aperture.

The two apertures 12 and 13 associated with the second and third passages 10 and 11 are equidistant from the axis of the first aperture so that a substantially U-shaped tubular connector member 14 mounted on an axle 15 co-incident with the axis of the first aperture, can be rotated between two positions in each of which the opposite end of the U-shaped connector member communicates with either the second or third aperture. The axle 15 extends out through a suitable sealing arrangement 17 in the wall of the first dome-shaped member so that rotation of the axle can be effected by means of a suitable lever engaged with a non-circular cross-sectioned outer end 18 to the axle.

Each end of the tubular connector member is sealed to the flat smooth sealing face 6a of the sealing plate 6 by means of a cylindrical seal 19 which is axially movable on the outside of the connector member and is sealed thereto by means of an O-ring 20. The sealing ring is urged towards the sealing surface of the sealing plate by a sinuous leaf-spring 21 bearing between the ring and a flange 22 fixed to the outer surface of the connector member. The connector member itself is biased towards the sealing surface of the sealing plate.

Firstly by reason of water pressure inside the bearing on the sealing ring surface domed member. External water pressure always exists inside the domed member except during switch over of the tubular connector member 14. In this way seal by-pass is minimized without requiring excessive or powerful mechanism to move the connector member 14 for switch over. It will be noted that external positive acting, as regards sealing, pressure always exists in the shell side of the valve external of the connector member 14.

Secondly the axle has a stop 23 bearing against the end surface of the seal assembly through which it passes which biases the sealing plate indirectly against the sealing surface. The opposite end of the axle is also carried in a similar seal and bearing assembly 16 located in the first passage defining pipe wall. This seal and bearing assembly embodies a thrust bearing to withstand forces exerted on the connector member.

It will be understood that as the connector member is rotated, by means of the axle, between its two operative positions from a position in which its movable end co-operates with the second or third aperture in the sealing plate to a position in which it co-operates with the other of those two apertures, the ring seal will simply slide on the sealing surface.

Figure 2:
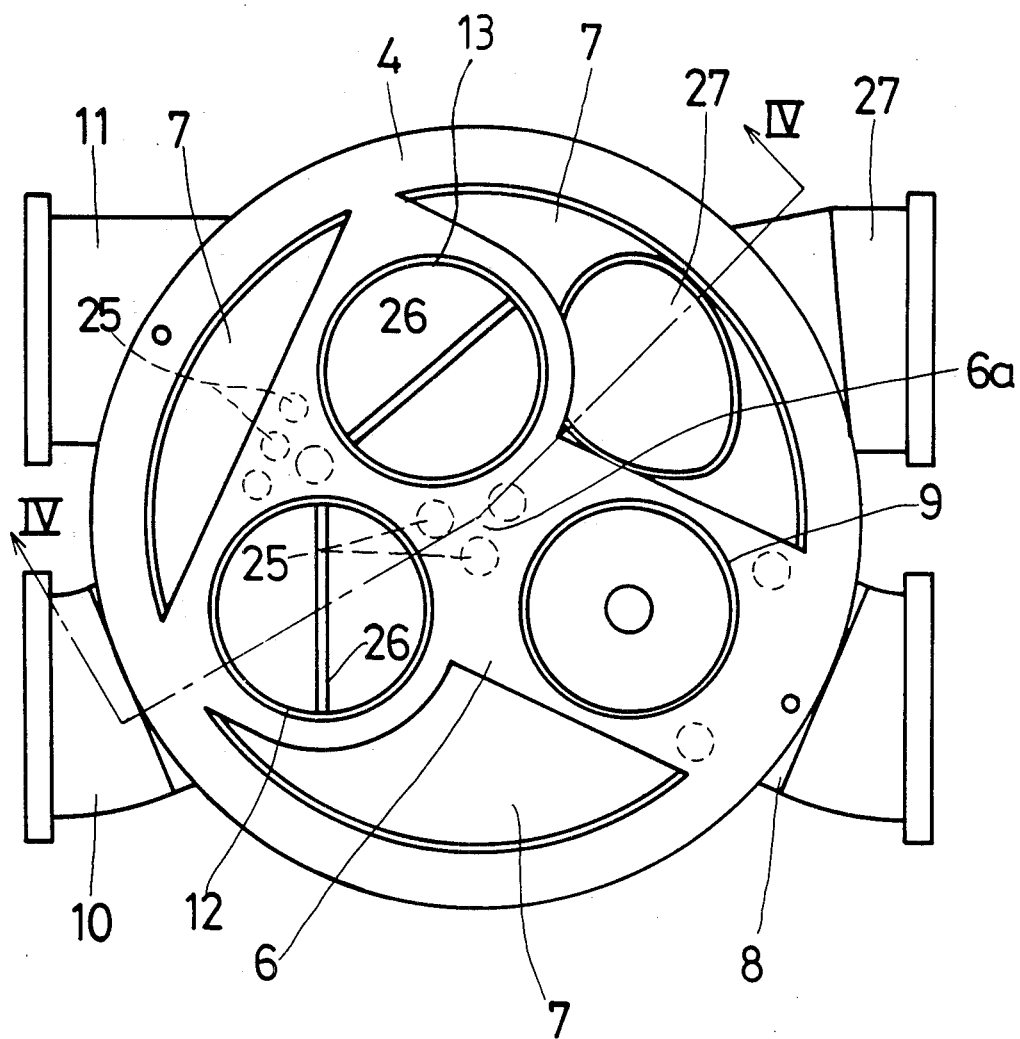
FIG. 2 is a plan view thereof with a first dome-shaped member and the tubular connector member removed.
Figure 3:
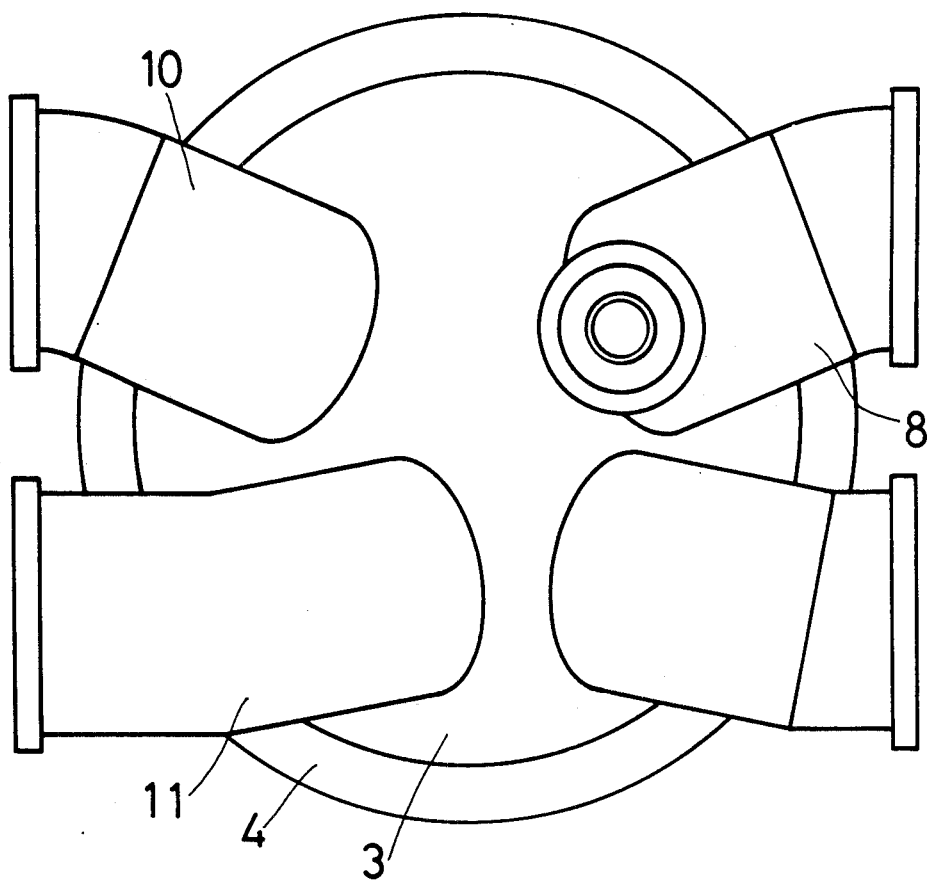
FIG. 3 is an inverted plan view showing the second chamber defining dome-shaped member.
Figure 4:
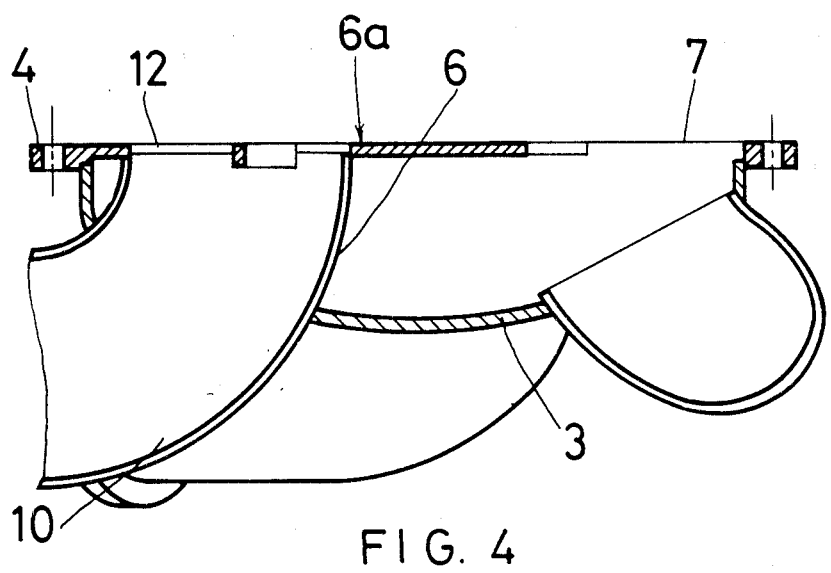
FIG. 4 is a sectional view taken along line IV—IV in FIG. 2.

Any undue pressure variations caused during flow reversal may be controlled by providing suitable perforations such as those indicated by dotted lines 25 in the sealing plate in regions outside of that required for sealing engagement by the sealing ring. Also, as illustrated in FIG. 2, one or more transverse support webs 26 can be provided across the apertures simply to avoid damage to the sealing rings during movement and to guide them along the sealing surface properly.

Finally the flow reverser assembly is provided with a fourth passage defining pipe 27 which communicates with the second domed member and is simply secured to the wall thereof. Such fourth passage defining pipe will, in general, and where the first one defines a permanent outlet, define a permanent inlet. As shown clearly in FIG. 2 said generally permanent outlet and inlet are generally parallel but laterally spaced and directed in the same direction whilst the second and third passage defining pipes can be directed in any required direction, in this case parallel and spaced apart but in the opposite direction. It will be understood that the exact directions of all four passages can be varied according to requirements and as dictated by surrounding circumstances, particularly where the flow reverser is to be installed in an existing situation.

It will be understood that, for use, the first and fourth passage defining pipes will be connected to what will usually be one-way flow pipes so that the one (generally the fourth) forms a permanent inlet and the other (generally the first) forms a permanent outlet.

The second and third passage defining pipes can be connected to two ends of heat exchanger tubes, for example those in which a brush is used to effect cleaning of the inside of the heat exchanger tubes periodically. In the one position of the tubular U-shaped connector member, for example when it communicates with the third aperture and thus the third passage defining pipe, fluid will enter into the chamber defined by the two opposed dome-shaped members by way of the fourth passage defining pipe. From there the fluid will flow through the open second aperture into the second passage defining pipe from whence it flows through the heat exchanger and returns through the third passage defining pipe and thence through the third aperture, the connector piece, and out through the first passage defining pipe.

It will be understood as explained earlier that the fluid within the chamber will exert a certain positive sealing force on the sealing ring whilst the sinuous or other leaf-spring will also urge the sealing ring into engagement with the sealing surface of the sealing plate. Thus a positive seal is achieved in contradistinction to prior art similar flow reverser assemblies. Also, there is only one major pressure drop through the assembly that being on the inlet side between the first and second passage defining pipes.

It will be understood that when a reversal of flow is required all that is necessary is for the axle to be rotated so that the tubular U-shaped connector member then communicates with the second aperture in the sealing plate and exposes the third aperture. Also the valve is uniquely designed so that the inlet portion stays at a fixed position and that at no stage of switching of the valve, one of its ports are fully closed thereby minimizing water hammer and eliminating costly valve structural design, as opposed to valves that fully close during switching to eliminate short circuiting.

Figure 5:
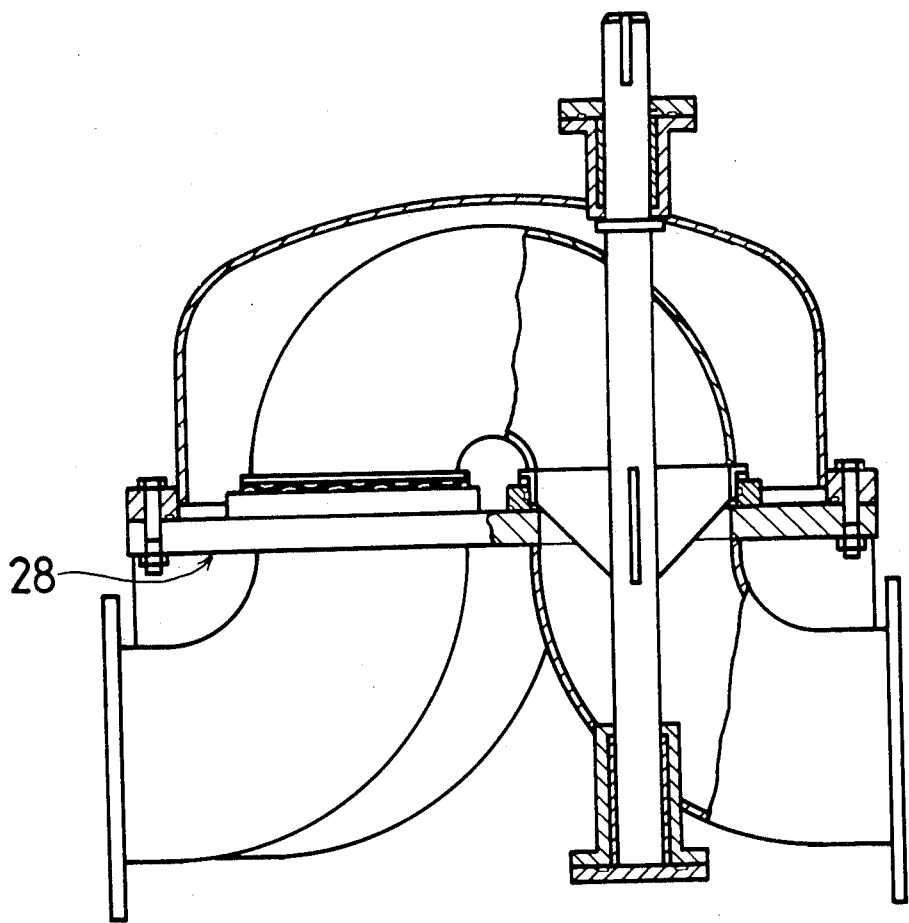
FIG. 5 is a partly sectioned elevation of a variation of the invention which is simpler to manufacture but more costly on materials.
Figure 6:
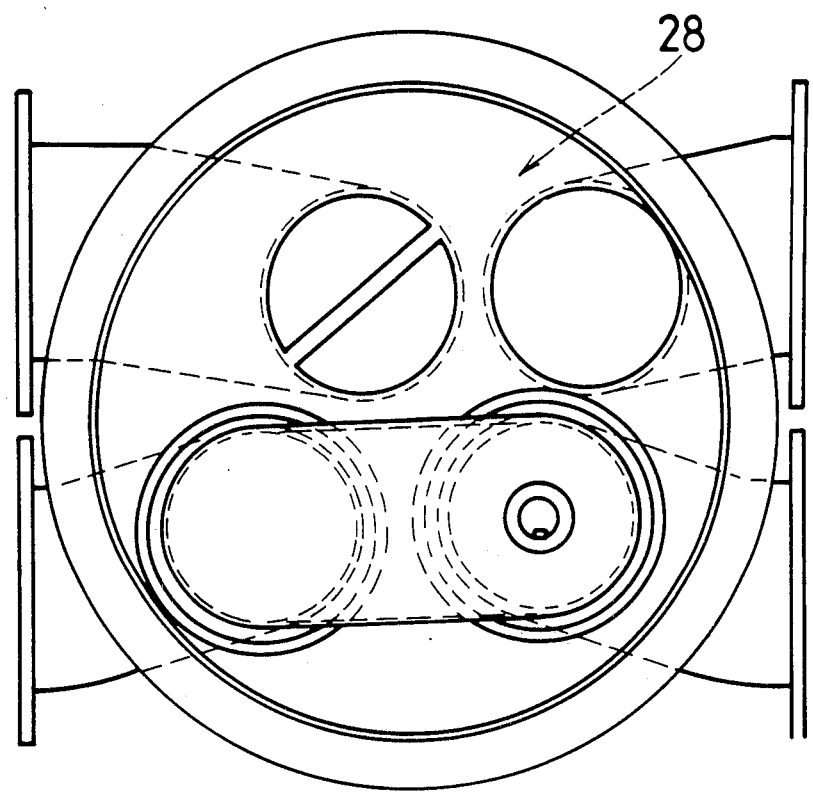
FIG. 6 is a plan view of the latter with the dome and connector member removed as in the case of FIG. 2.
Figure 7:
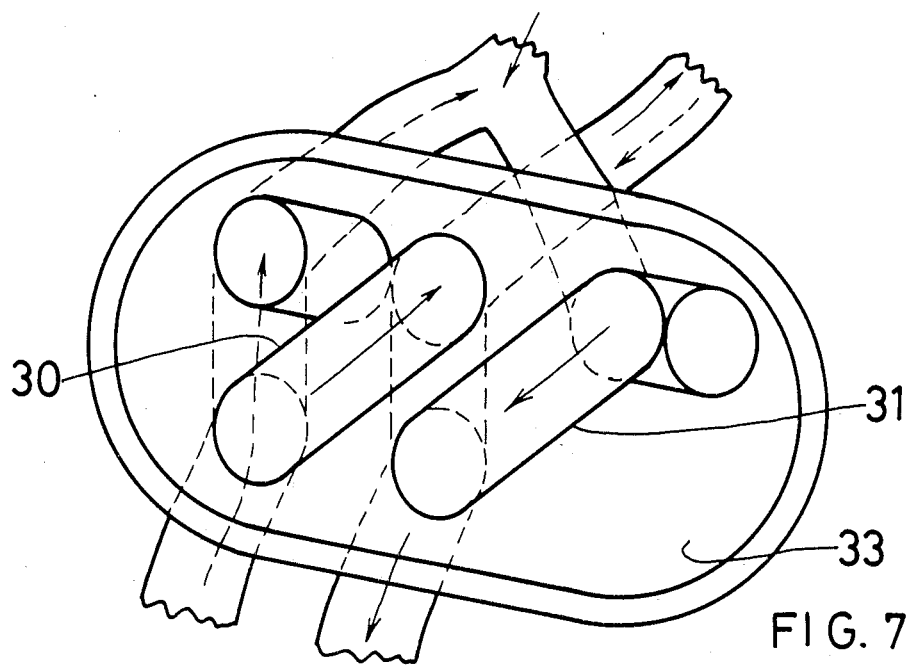
FIG. 7 is a plan view of a third variation of the invention.

It will be appreciated that whilst two dome-shaped members are desirable, from a pressure acceptance point of view when measured against cost of construction, actual manufacture of a second domed-shaped member as above described may be somewhat difficult. If this is undesirable, a simple continuous sealing plate could replace the second domed member but, in such a case, in view of the flat nature of the plate, it would have to be substantially more robust. In such a case the first, second, third and fourth passage defining pipes can simply be welded to the outer surface 28 of such a chamber as shown clearly in FIG. 5. The fact that four passage defining pipes, at least for convenience, must be welded to the same plate also necessitates that the sealing plate will have to be of a larger diameter than in the first described embodiment where only three passage defining pipes have to be welded to the plate and the one can be welded to the second dome-shaped member. Of course, the fourth passage defining pipe could be welded to the first dome-shaped member but, generally speaking, this is considered to be undesirable in view of the asymmetry which results. FIG. 6 illustrates the fact that the chamber must be of a larger diameter in this case.

Where a larger chamber is acceptable, as illustrated in FIG. 7, two U-shaped tubular connector members 30 and 31 can be provided for movement in unison to co-operate with one of three apertures in the sealing plate 33. In this case the two outer apertures will be connected together and the connector members must have associated therewith a further stop member on each side of the assembly so that, in each selected position of the connector members, the unused aperture in the sealing plate is closed off by means of a closure plate, thus rendering it inutile.

Figure 8:
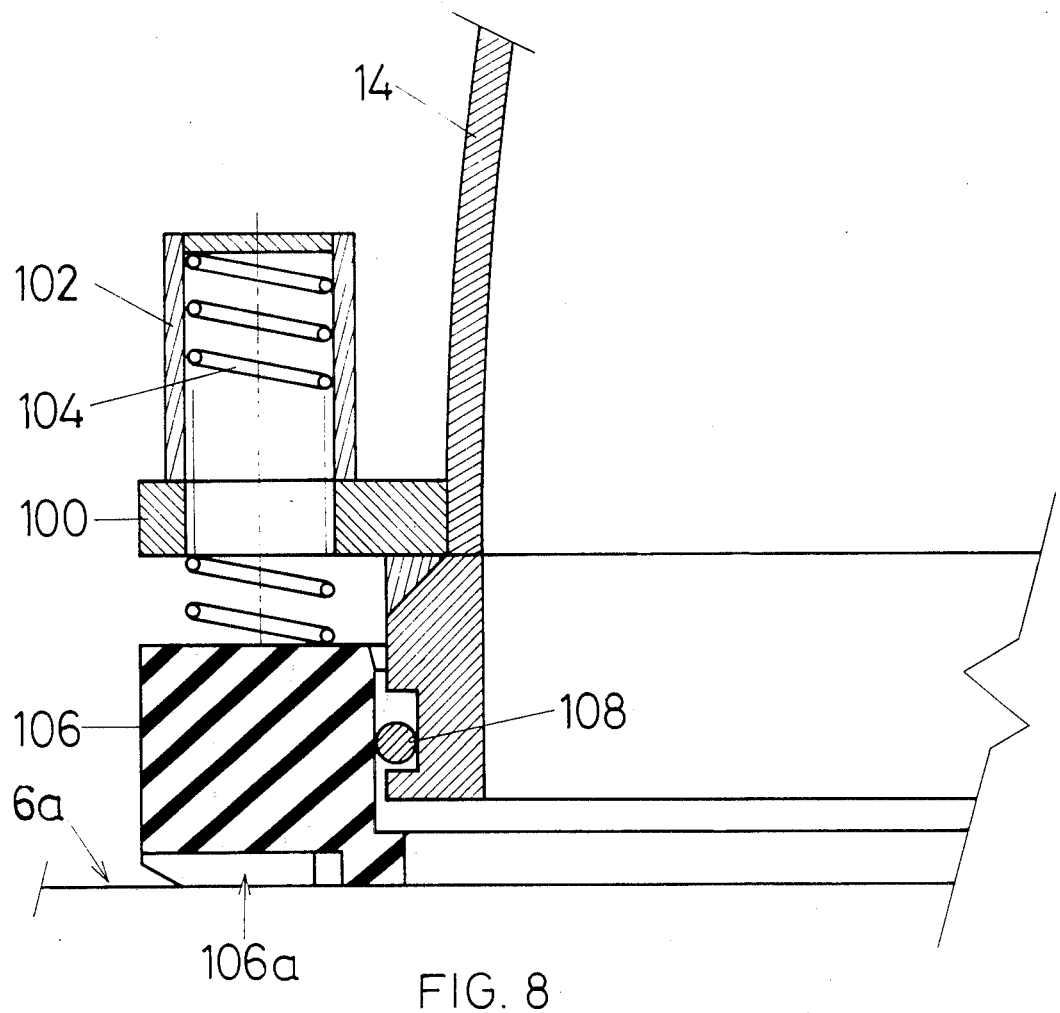
FIG. 8 shows part of a cylindrical seal in cross-section.

In FIG. 8, a sealing arrangement is clearly shown. Adjacent the end of the connector member 14 a bracket 100 supports cylinders 102 in which coil springs 104 are mounted. The coil springs urge a cylindrical rubber seal 106 against the sealing surface 6a. The rubber seal 106 is sealed against the outside of the member 14 by an O-ring 108. The sealing surface is cut away at four quadrants to provide four channels 106a. In under-plan a central annular sealing surface forms the seal and an outer annular rubbing surface help strengthen and support the sealing surface. The channels 106a allow fluid to enter a narrow circular groove or channel 106b separating the inner and outer annular surfaces. The separation of the lower surface into different parts as described means that the seal can be "broken" relatively easily when the connector must be moved from its one operative position towards its other operative position. As explained earlier the fluid pressure in the domed member automatically aids the seal 106 in its sealing position when the end of the member 14 is properly aligned with the aperture 12 or 13.

Figure 9A:
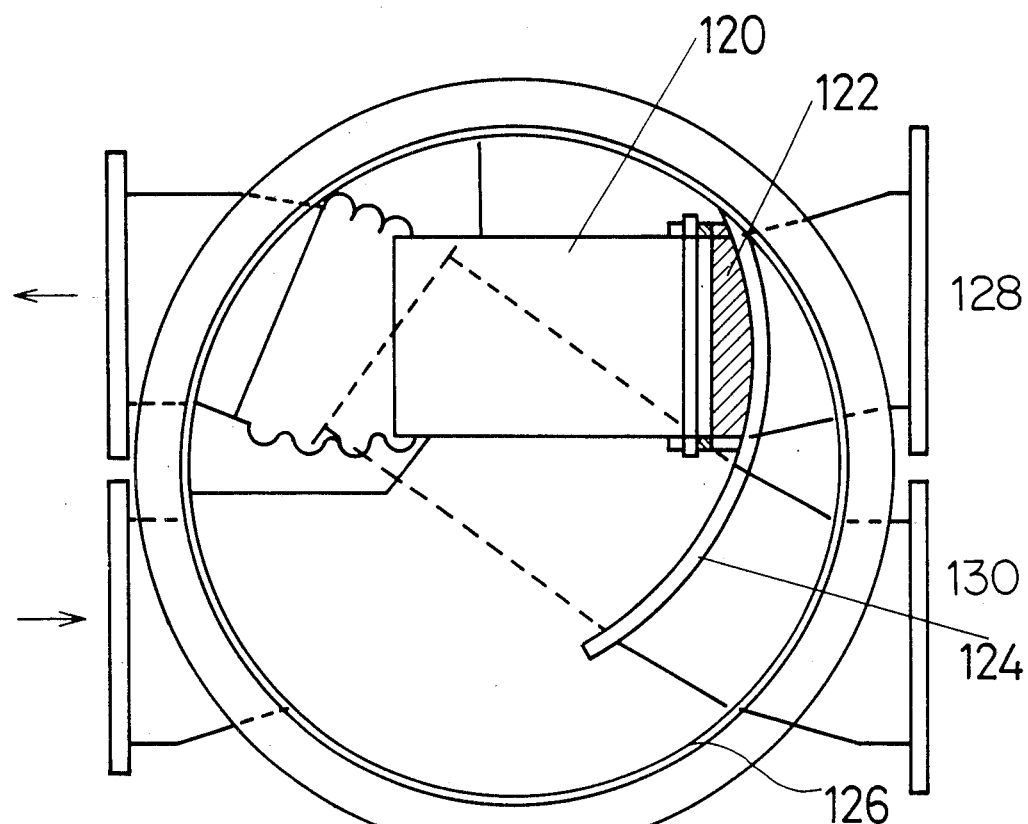
FIG. 9A shows a plan view of a fourth variation of the invention.
Figure 9B:
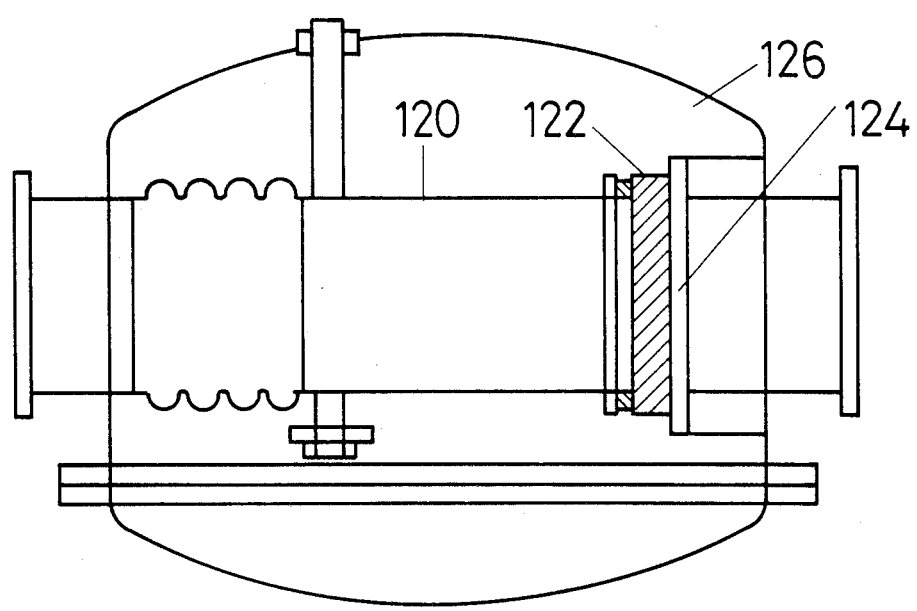
FIG. 9B shows an elevation of the variation in FIG. 9A.
Figure 10:
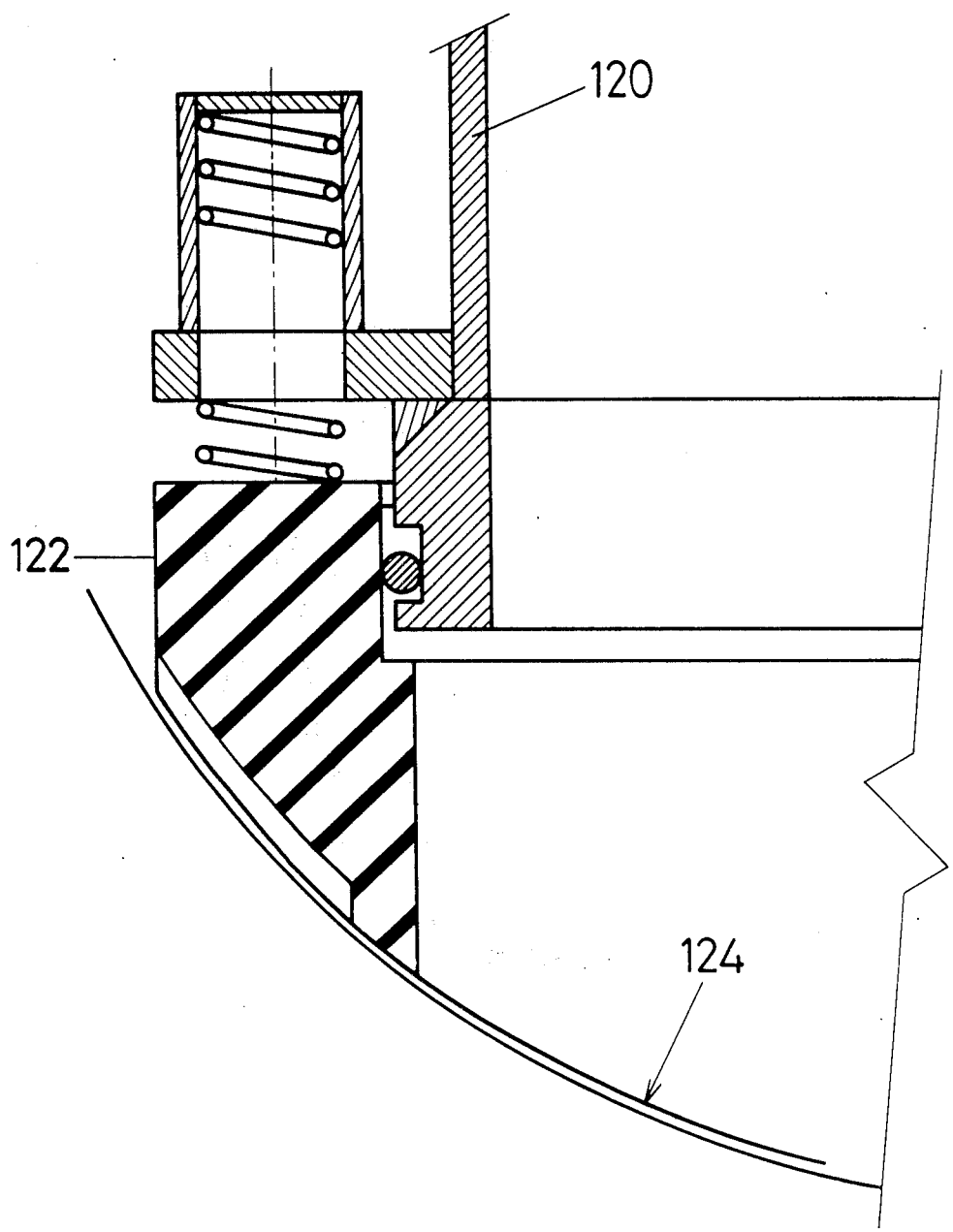
FIG. 10 shows part of a cylindrical seal for the fourth-variation.

In FIG. 9 a connector member 120 can take up two operative positions either position A or position B. The end of the connector member 120 has mounted adjacent its end surface a resilient cylindrical seal 122. The seal 122, as shown in detail in FIG. 10, has a curved surface so as to bear against a sealing plate 124 mounted in a chamber 126.

The member is in communication with a passage 128 when in position A and a passage 130 when in position B via respective apertures through the sealing plate 124.

In a manner similar to that described above, the fluid pressure in the chamber 126 around the connector member 120 serve to aid the seal 122 to press against the sealing plate 124 when the member 120 is aligned up with the appropriate apertures in the sealing plate.

It will be understood that numerous other variations may be made to the above described embodiments of the invention. In particular the connector members need not be of the exact nature described above as in the case of the construction of the chamber.

I claim:

1. A fluid flow reverser assembly comprising a body defining a chamber, a first passageway communicating with a first aperture into the chamber, second and third passageways respectively communicating with second and third apertures into the chamber located in a sealing plate with their surfaces equidistant from the first aperture but angularly spaced apart, a tubular connector member in the chamber having one end co-axially associated with the first aperture and movable so that its other end can be selectively aligned in two operative positions either with the second or third aperture, resilient sealing means mounted on the other end of the connector member for sealing around the second or third apertures, a cylindrical seal at the end of the connector member surrounding the outer surface thereof arranged to seal between the end of the connector member and the sealing plate, means for moving the connector member between its two operative positions, and a fourth passageway in communication with the chamber so as to be in communication with whichever of the second or third apertures is not in cooperation with said tubular connector member.

2. A reverser assembly according to claim 1, in which the seal is pressed towards the sealing plate by one or more springs.

3. A reverser assembly according to claim 2 including an "O"-ring between the outer periphery of the end of the connector and the inner surface of the seal.

4. A fluid reverser comprising a body defining a chamber, a first passageway communicating with a first aperture in a sealing plate and directed away from the latter on the side opposite the sealing surface thereof; second and third passageways positioned on the same side of the sealing plate as the first passageway and communicating with second and third apertures through the sealing plate and located with their axes substantially equidistant from the axis of the first aperture but angularly space apart; a tubular connector member having one end co-axially associated with the first aperture in the sealing plate, on the sealing surface side thereof and being rotatable about said axis between two operative positions, one in which its opposite end is aligned with the second aperture and in the other of which it is aligned with the third aperture in the sealing plate; sealing means being provided for sealing the ends of the connector member to the sealing plate, including a cylindrical seal at the end of the connector member surrounding the outer surface thereof arranged to seal between the end of the connector member and the sealing plate; means for rotating the tubular connector member between said two positions; and a fourth passageway associated with the body so as to be in communication with the second or third aperture in the sealing plate whichever is not in co-operation with said tubular connector means.

5. A reverser assembly according to claim 4, in which a tubular connector is a substantially "U"-shape.

6. A reverser assembly according to claim 4, in which the tubular connector member is fixed to an axle which is co-axial with the inlet passage and the tubular connector at the plane of the sealing plate, the axle extending outwardly from at least one end of the assembly and rotatably supported thereby to provide an external coupling to enable the connector to be moved via the axle between its operative positions.

7. A reverser assembly according to claim 4, in which the seal is pressed towards the sealing plate by one or more springs.

8. A reverser assembly according to claim 7, including a "O"-ring between the outer periphery of the end of the connector and the inner surface of the seal.

* * * * *